United States Patent
Cudak et al.

(10) Patent No.: US 10,595,086 B2
(45) Date of Patent: Mar. 17, 2020

(54) SELECTION AND DISPLAY OF DIFFERENTIATING KEY FRAMES FOR SIMILAR VIDEOS

(71) Applicant: INTERNATIONAL BUSINESS MACHINES CORPORATION, Armonk, NY (US)

(72) Inventors: Gary D. Cudak, Wake Forest, NC (US); Lydia M. Do, Raleigh, NC (US); Christopher J. Hardee, Raleigh, NC (US); Adam Roberts, Moncure, NC (US)

(73) Assignee: International Business Machines Corporation, Armonk, NY (US)

( * ) Notice: Subject to any disclaimer, the term of this patent is extended or adjusted under 35 U.S.C. 154(b) by 522 days.

(21) Appl. No.: 14/735,226

(22) Filed: Jun. 10, 2015

(65) Prior Publication Data
US 2016/0366484 A1  Dec. 15, 2016

(51) Int. Cl.
G06F 3/048 (2013.01)
H04N 21/472 (2011.01)
G06K 9/00 (2006.01)

(52) U.S. Cl.
CPC ... H04N 21/47205 (2013.01); G06K 9/00751 (2013.01); G06K 9/00758 (2013.01)

(58) Field of Classification Search
CPC .......... G06F 17/30843; G06K 9/00744; G06K 9/00751; G06K 9/00758; G06K 9/00765; G06K 9/00711; G06K 9/00; G06K 9/46; H04N 21/8549; H04N 21/440236; H04N 21/44008; H04N 21/23418

USPC .................................................... 725/44, 59
See application file for complete search history.

(56) References Cited

U.S. PATENT DOCUMENTS

| | | | |
|---|---|---|---|
| 7,495,795 B2 | 2/2009 | Graham et al. | |
| 2006/0103732 A1* | 5/2006 | Bateman | G06F 17/30811 348/208.2 |
| 2007/0204238 A1 | 8/2007 | Hua et al. | |
| 2007/0237225 A1 | 10/2007 | Luo et al. | |
| 2007/0266322 A1* | 11/2007 | Tretter | G11B 27/105 715/716 |
| 2009/0100462 A1 | 4/2009 | Park et al. | |
| 2009/0172727 A1* | 7/2009 | Baluja | G06Q 30/00 725/34 |
| 2010/0085481 A1 | 4/2010 | Winter et al. | |
| 2011/0064318 A1 | 3/2011 | Gao et al. | |
| 2011/0292288 A1 | 12/2011 | Deever | |

(Continued)

OTHER PUBLICATIONS

Anonymous. "Preview YouTube Videos: Mouse Over to Play, Watch Video Thumbnails". SnapHow.com, May 19, 2015.

(Continued)

*Primary Examiner* — Alex Olshannikov
(74) *Attorney, Agent, or Firm* — Law Office of Jim Boice

(57) ABSTRACT

A method, system, and or computer program product selects and displays keyframes for multiple video files on a graphical user interface (GUI). A first set of keyframes for a first video file and a second set of keyframes for a second video file are received and compared to one another. In response to determining that a keyframe from the first set of keyframes and a keyframe from the second set of keyframes are a duplicate keyframe, a new keyframe for the second video file is selected and displayed on the GUI to represent the second video file.

19 Claims, 4 Drawing Sheets

(56) References Cited

U.S. PATENT DOCUMENTS

| | | | |
|---|---|---|---|
| 2012/0123780 A1 | 5/2012 | Gao et al. | |
| 2012/0177296 A1 | 7/2012 | Ren et al. | |
| 2012/0321201 A1* | 12/2012 | Hill | G06K 9/00751 382/218 |
| 2015/0279428 A1* | 10/2015 | Ryu | G11B 27/28 386/241 |

OTHER PUBLICATIONS

Girgensohn, Andreas, and John Boreczky. "Time-Constrained Keyframe Selection Technique." Kluwer Academic Publishers. Multimedia Tools and Applications 11 (2000): 347-58.

* cited by examiner

US 10,595,086 B2

SELECTION AND DISPLAY OF DIFFERENTIATING KEY FRAMES FOR SIMILAR VIDEOS

BACKGROUND

The present disclosure relates to the field of electronic communication devices, and specifically to the use of electronic communication devices that are capable of displaying video files. Still more particularly, the present disclosure relates to electronic communication devices that display keyframes from video files.

A keyframe is defined as a frame from a video file that has been selected to represent the video file and/or content from the video file. For example, a video file server may present, on a graphical user interface (GUI), offerings of multiple video files. Rather than only identifying the offerings on the GUI by their text names, the video file server will also show a frame from each video file on the GUI. For example, if a first video file is of a kitten playing with a ball, then the keyframe for that video file will show a "snapshot" frame of the kitten and the ball on the GUI. If a second video file is of a singer performing in concert, then the keyframe for that video file will show on the GUI a "snapshot" frame of the singer while performing. Thus, a user can quickly identify the type and content of video files being offered by looking at the keyframes.

In some cases, the video file server will show just one keyframe for each video. In other cases, the video file server will show multiple keyframes for each video. The multiple keyframes may be shown simultaneously, or they may be shown consecutively (either serially or randomly). Consecutive displays of the keyframes may be prompted by a user hovering a mouse over a first displayed keyframe, or they may be automatically displayed in a consecutive manner.

SUMMARY

A method, system, and or computer program product selects and displays keyframes for multiple video files on a graphical user interface (GUI). A first set of keyframes for a first video file and a second set of keyframes for a second video file are received and compared to one another. In response to determining that a keyframe from the first set of keyframes and a keyframe from the second set of keyframes are a duplicate keyframe, a new keyframe for the second video file is selected and displayed on the GUI to represent the second video file.

DETAILED DESCRIPTION

Figure 1:
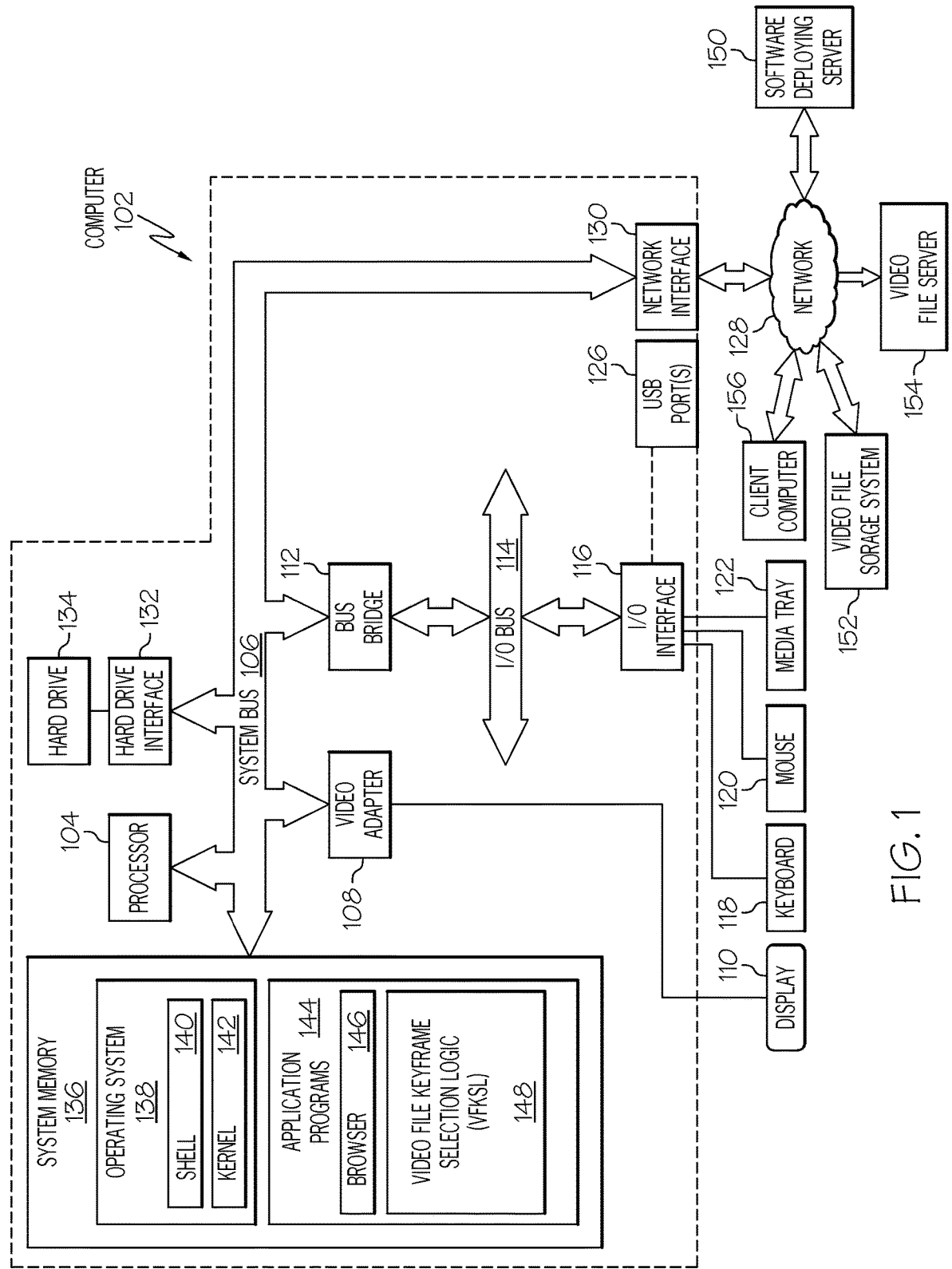
FIG. 1 depicts an exemplary system and network in which the present disclosure may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular to FIG. 1, there is depicted a block diagram of an exemplary system and network that may be utilized by and/or in the implementation of the present invention. Some or all of the exemplary architecture, including both depicted hardware and software, shown for and within computer 102 may be utilized by software deploying server 150 and/or a video file storage system 152 and/or a video file server 154 and/or client computer 156.

Exemplary computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150, video file storage system 152, video file server 154, and/or client computer 156 using a network interface 130. Network interface 130 is a hardware network interface, such as a network interface card (NIC), etc. Network 128 may be an external network such as the Internet, or an internal network such as an Ethernet or a virtual private network (VPN). In one or more embodiments, network 128 is a wireless network, such as a Wi-Fi network.

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. While shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Application programs 144 in computer 102's system memory (as well as software deploying server 150's system memory) also include a video file keyframe selection logic (VFKSL) 148. VFKSL 148 includes code for implementing the processes described below, including those described in FIGS. 2-4. In one embodiment, computer 102 is able to download VFKSL 148 from software deploying server 150, including in an on-demand basis, wherein the code in VFKSL 148 is not downloaded until needed for execution. In one embodiment of the present invention, software deploying server 150 performs all of the functions associated with the present invention (including execution of VFKSL 148), thus freeing computer 102 from having to use its own internal computing resources to execute VFKSL 148.

The hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

Figure 2:
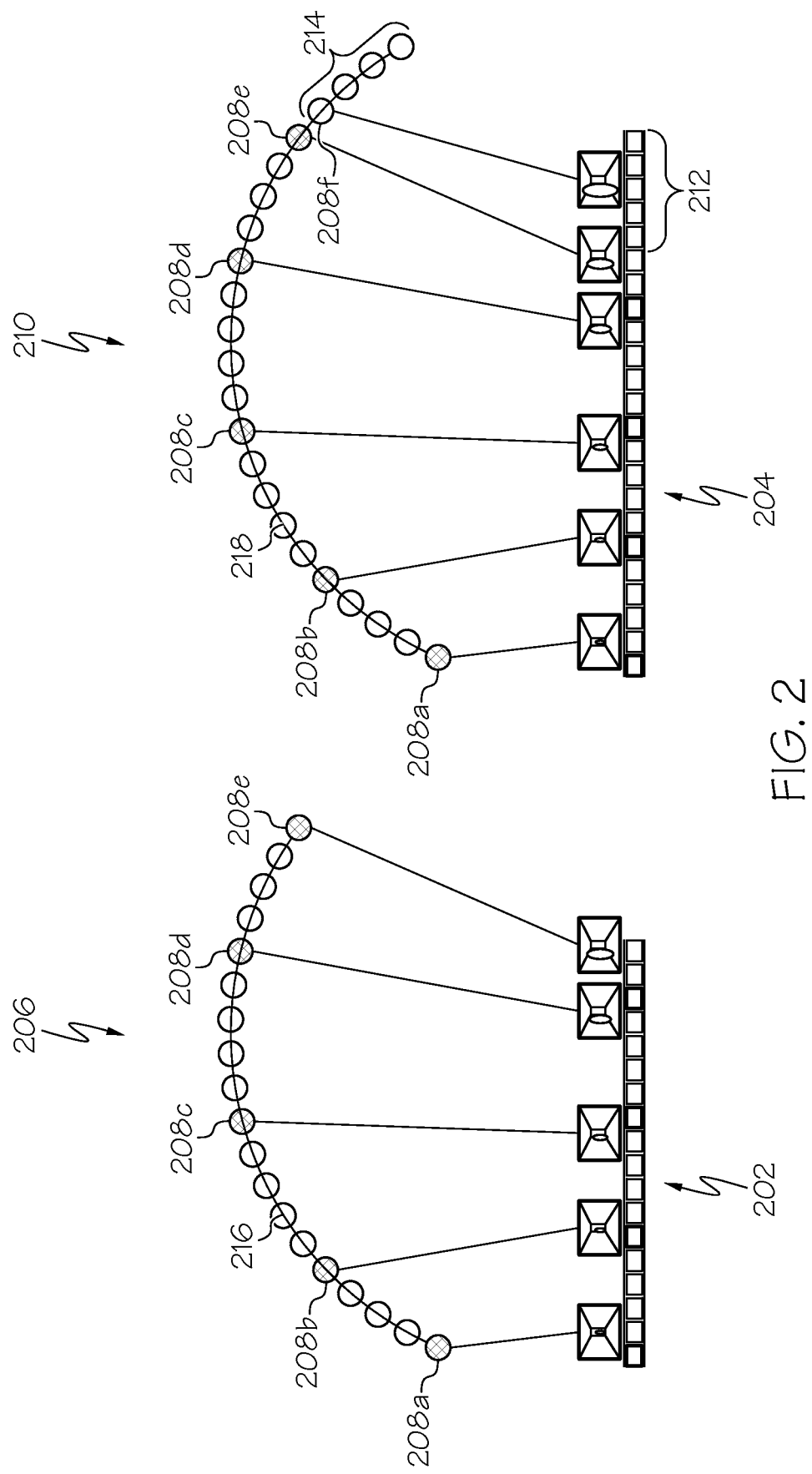
FIG. 2 illustrates a first video file and a second video file that have overlapping/duplicate keyframes and yet have different content.

With reference now to FIG. 2, a first video file 202 and a second video file 204 that have overlapping and yet have different content are presented. First video file 202 and/or second video file 204 may be retrieved from the video file storage system 152 by the video file server 154 shown in FIG. 1. The video files and/or keyframes and/or GUIs described herein may be displayed on a display 110 in the computer 102 and/or on a client computer 156 (used by a customer/end user).

As shown, first video file 202 and second video file 204 are made up of multiple video frames. Although such frames may be recorded at the standard 24 frames-per-second rate, for purposes of clarity and simplicity, such frames are depicted at a rate (e.g., one frame per minute) that enables different frames to present significantly different images. However, it is to be understood that there are actually many more frames than those shown between the depicted keyframes 208a-208e in FIG. 2.

As shown in FIG. 2, first video file 202 has multiple video frames, graphically represented as frames 206. Within the frames 206 are keyframes 208a-208e. The keyframes 208a-208e may be selected manually by a user, or they may be from default locations within the first video file 202. That is, as graphically shown in the frames 206, every fourth frame is selected as a keyframe.

Keyframes 208a-208e are select frames from frames 206 that can be used as icons (e.g., thumbnails) that represent content found within the first video file 202. For example, assume that the first video file 202 is a trailer for a movie. Keyframe 208a may be a frame that shows a lead character in one scene; keyframe 208b may show the lead character in another scene; keyframe 208c may show a secondary character in a scene; keyframe 208d may show a vehicle from the movie; and keyframe 208e may show the name of the movie.

Figure 3:
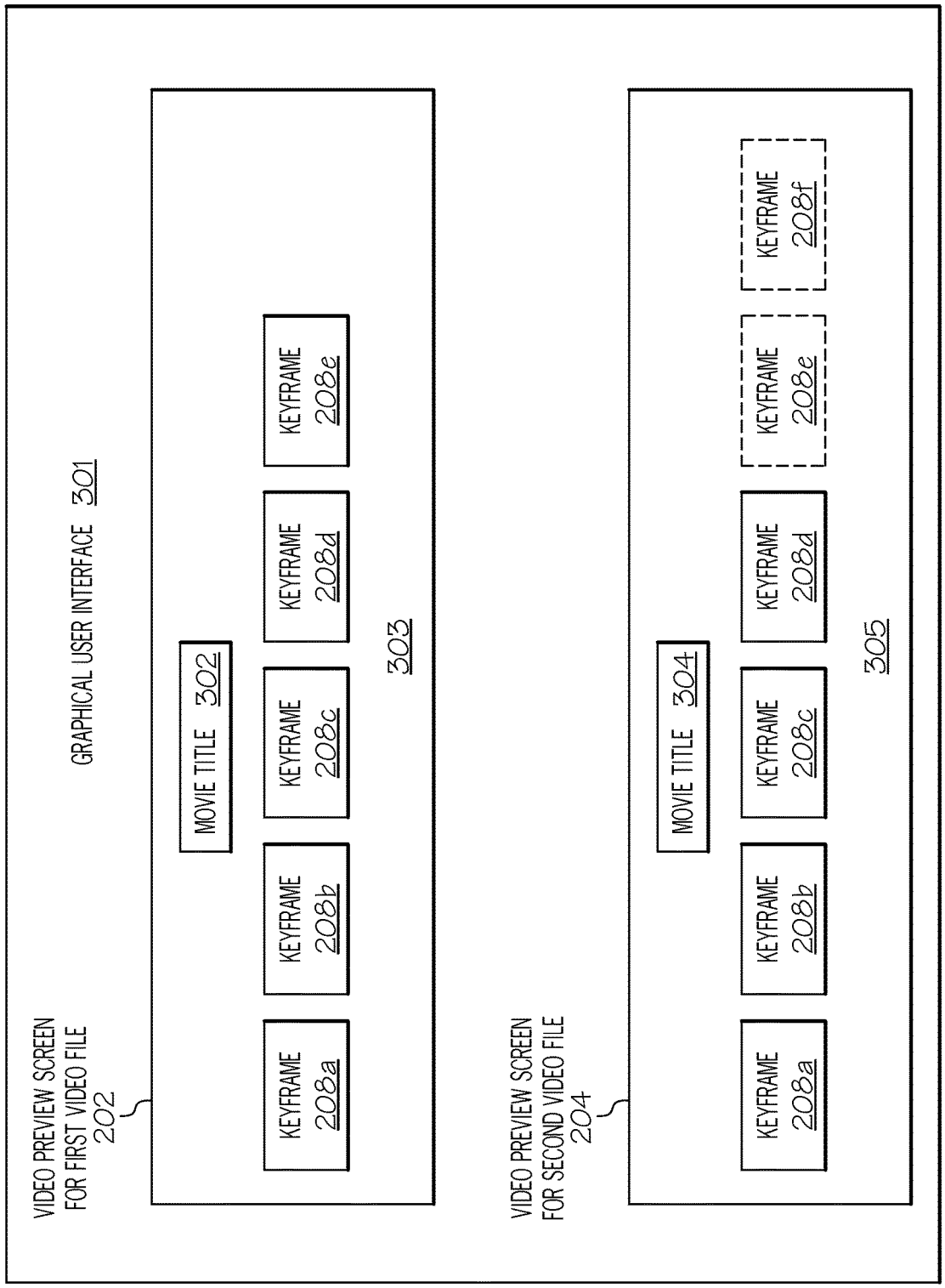
FIG. 3 depicts a user interface displaying keyframes from the first and second video files shown in FIG. 2.

The movie trailer may be offered via a graphical user interface (GUI), such as a GUI generated by a video file sharing service that has access to the video file storage system 152 and the video file server 154 shown in FIG. 1. As shown in FIG. 3, this GUI 301 presents a window pane 303. Within the window pane 303 is a movie title box 302, which shows the title of the movie to which the movie trailer (e.g., first video file 202 in FIG. 2) is associated. Also within the window pane 303 are one or more of the keyframes 208a-208e (e.g., video "snapshots" displayed as icons/thumbnails on the GUI) that are taken from the movie trailer. Keyframes 208a-208e may be displayed simultaneously (as shown), or they may be displayed one at a time, or only one of the keyframes 208a-208e may ever be shown in window pane 303. In any embodiment, if the user hovers a mouse over and clicks (or otherwise inputs a selection signal to) the keyframe, then the movie trailer itself will be displayed to the user by executing the first video file 202 in FIG. 2.

Returning to FIG. 2, the second video file 204 also has frames 210, similar to the frames 206 for the first video file 202. However, there are additional frames 212/214 in the second video file 204/frames 210. That is, additional content represented by frames 212/214 come at the end of the video file 204/frames 210. However, the same keyframes 208a-208e selected for the first video file 202 have also been selected for the second video file 204. As such, the same keyframes 208a-208e would be presented in the window pane 305 in FIG. 3 for the second video file 204. This leads to the user assuming that the first video file 202 and the second video file 204 are identical. The present invention overcomes this confusion by comparing the keyframes and displaying one or more different keyframes for the second video file 204.

That is, once the system (e.g., VFKSL 148 shown in FIG. 1) determines that the first video file 202 and the second video file 204 contain different content, and yet the keyframe(s) for the first video file 202 and the second video file 204 are the same, then at least one new keyframe is selected to be used as an icon/thumbnail to describe the second video file 204 on a GUI.

That is and with reference again to FIG. 2, note that the system had initially selected keyframe 208e from the frames 210 as one of the keyframes for second video file 204. However, keyframes 208a-208e from frames 210 and keyframes 208a-208e from frames 206 are the same keyframes. In order to differentiate the content of the two video files 202/204, a new keyframe 208f is selected from the added/different frames 214/212 shown in the frames 210/second video file 204. This results in keyframes 208a, 208b, 208c, 208d, and 208f being displayed as icons/thumbnails in the window pane 305 shown in FIG. 3.

Although the different frames 214/212 from FIG. 2 are represented as being appended to the end of the frames 210/second video file 204, in another embodiment the changes to the frames 210/second video file 204 may be internal to the frames 210/second video file 204. That is, the first video file 202 and the second video file 204 may be the same length, but there may be different frames within the video files. For example, frame 216 in frames 206 may be different from frame 218 in frames 210. Assuming that the system realizes that the first video file 202 and the second video file 204 are not identical (e.g., by having different version numbers, different metadata, different lengths, etc.), then the system will shift one or more selected keyframes (e.g., from keyframe 208b to frame 218 or from keyframe 208e to frame 208f for the second video file 204), thus enabling the system to present unique thumbnails/keyframes for a particular video file.

In one embodiment of the present invention, incremental units of frame (e.g., 1000 frames) are skipped over to find a new frame as a new keyframe. That is, the $1000^{th}$ next frame is chosen as a new keyframe for the second video file 204. If this frame still matches one of the existing keyframes of the first video file 202 and/or the second video file 204, then the next 1000 frames are skipped over to find the $2000^{th}$ subsequent frame as a candidate new keyframe.

In one embodiment of the present invention, the number of frames to look forward to (in order to identify a new keyframe) is a function of past success rates. For example, assume that initially the next frame (or realistically, the next 1000$^{th}$ frame) away from a duplicate keyframe is selected to be the new keyframe for the second video file 204. If this does not locate a keyframe that is different from those used by the first video file 202, then the subsequent (e.g., 2000$^{th}$) frame is selected. Based on where success in finding a new keyframe occurs, this same pattern will be stored and used in future searches for new keyframes.

Figure 4:
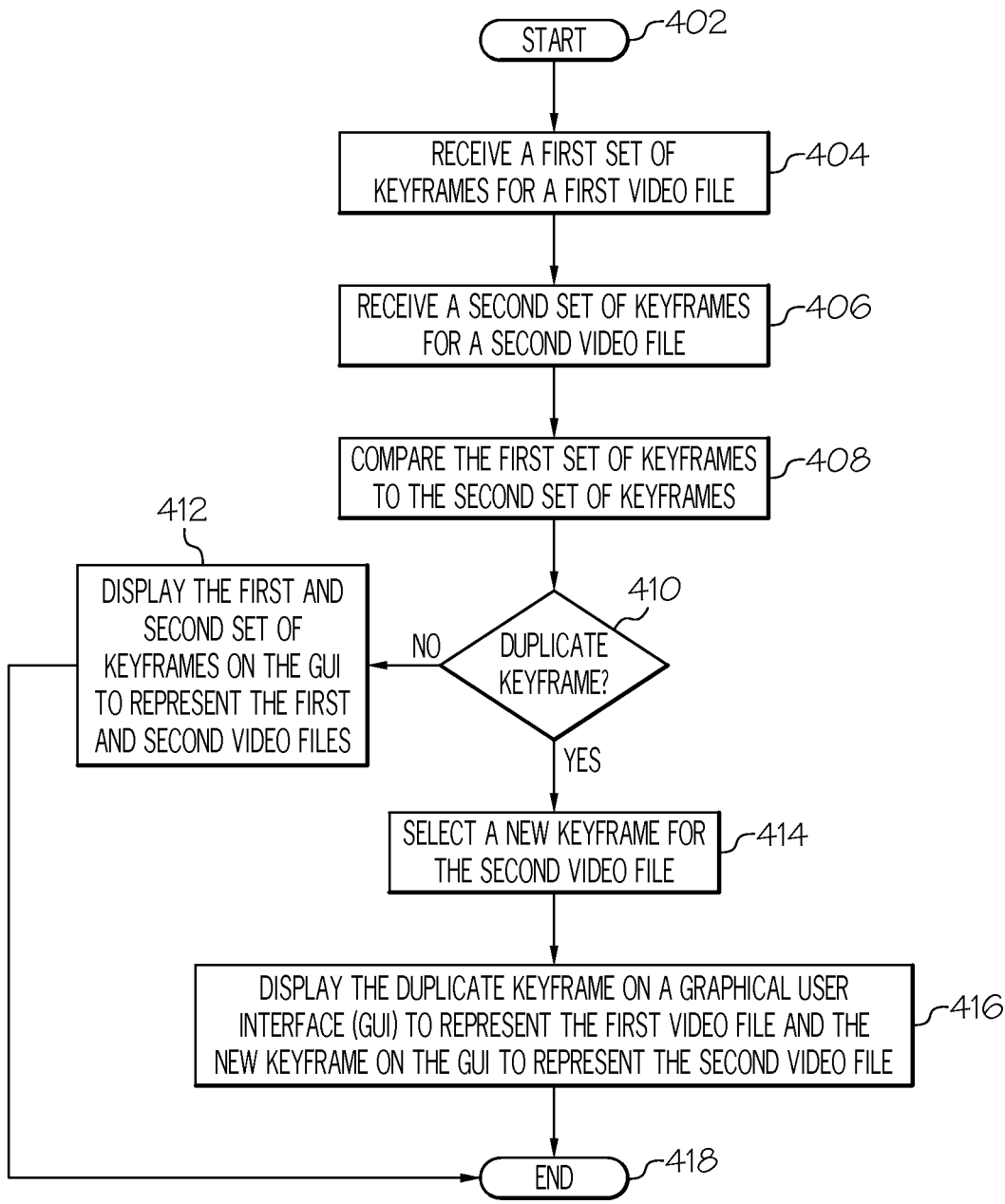
FIG. 4 is a high-level flow chart of one or more steps performed by one or more processors to select and display keyframes on a graphical user interface.

With reference now to FIG. 4, a high-level flow chart of one or more steps performed by one or more processors to select and display keyframes for multiple video files on a graphical user interface is presented.

After initiator block 402, a first set of keyframes (e.g., keyframes 208a-208e shown in FIG. 2) for a first video file (e.g., first video file 202 in FIG. 2) is received, as described in block 404. As defined herein, a keyframe is a frame from a video file that will be used to represent a portion of content from the video file (e.g., as a thumbnail or other static icon).

As described in block 406, a second set of keyframes (also keyframes 208a-208e shown in FIG. 2) for a second video file (e.g., second video file 204 in FIG. 2) is also received.

As described in block 408, the first set of keyframes is compared to the second set of keyframes.

If all of the keyframes from the first set of keyframes and the second set of keyframes are duplicates of one another (query block 410), then the first and second sets of keyframes are displayed as representations of the first and second video files (block 412). However, if one or more of the keyframes from the first set of keyframes and the second set of keyframes are duplicates of one another (query block 410), then a new keyframe for the second video file is selected (block 414).

This allows the duplicate keyframe to be displayed on a graphical user interface (GUI) to represent the first video file (see window pane 303 in FIG. 3), while displaying the new keyframe on the GUI to represent the second video file (see window pane 305 in FIG. 3), as described in block 416.

The flow-chart ends at terminator block 418.

In one embodiment of the present invention, the first set of keyframes is a single keyframe, and the second set of keyframes is also a single keyframe. That is, assume that only one keyframe is displayed on the GUI to represent the first video file and only one keyframe is displayed on the GUI to represent the second video file. If these two keyframes are identical but the first and second video files are different, then a new keyframe will be selected for the second video file.

In one embodiment of the present invention, the first set of keyframes comprises multiple keyframes, and the second set of keyframes comprises multiple keyframes, as shown in FIG. 3. In this embodiment, the multiple keyframes can be displayed simultaneously or one at a time.

In one embodiment of the present invention, the new keyframe for the second video file is selected by identifying a keyframe in the second video file that is not part of the first video file. This new keyframe may be an addition to the frames (see element 214 in FIG. 2), or it may be a change (e.g., replacement) to one of the frames (see element 218 in FIG. 2).

The decision regarding which keyframes are adjusted may be based on various factors.

For example, in one embodiment of the present invention a popular video file keeps its initial keyframes, even if there are other similar video files. Thus, in response to determining that the first video file is viewed more often (i.e., is more popular) than the second video file, the first set of keyframes for the first video file is locked (i.e., is not changeable) while the second set of keyframes is adjusted (e.g., replacing keyframe 208e with keyframe 208f for the second video file 204 shown in FIG. 2).

In one embodiment of the present invention, the decision regarding which video file will have its keyframes adjusted is based on the respective sizes of the video files. Thus, in response to determining that the first video file is smaller than the second video file, the first set of keyframes is locked while the second set of keyframes are adjusted. That is, since the first video file is small, and thus does not have as many frames from which the keyframes can be selected, then the keyframes for the first video file remain fixed and one or more of the keyframes for the second video file are adjusted/modified, as described herein.

In one embodiment of the present invention, the decision regarding which video file will have its keyframes adjusted is based on whether or not a video file is related to another video file. Thus, in response to determining that the first video file is related to a third video file, the first set of keyframes for the first video file are locked. For example, assume that the first video file is linked to another video file that is displayed on a different webpage. That is, the first video file may be a movie trailer for a movie, while the third video file may be an interview with the director of the movie found on another webpage. In order to maintain the continuity of the keyframe(s) being displayed for the movie trailer, the keyframe(s) for the first video file (e.g., the movie trailer) are locked, such that they cannot be altered.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method comprising:
   receiving, by one or more processors, a first set of keyframes for a first video file, wherein a keyframe is a frame from a video file, and wherein the first set of keyframes is composed of multiple keyframes from the first video file;
   receiving, by one or more processors, a second set of keyframes for a second video file, wherein the second set of keyframes is composed of multiple keyframes from the second video file;
   comparing, by one or more processors, the first set of keyframes to the second set of keyframes;
   in response to determining that a keyframe from the first set of keyframes and a keyframe from the second set of keyframes are a duplicate keyframe, selecting, by one or more processors, a new keyframe for the second video file, wherein the new keyframe replaces the duplicate keyframe in the second set of keyframes;
   displaying, by one or more processors, the first set of keyframes with the duplicate keyframe on a graphical user interface (GUI) to represent the first video file;
   displaying, by one or more processors, the second set of keyframes without the duplicate keyframe and with the new keyframe on the GUI to represent the second video file;
   determining, by one or more processors, that the first video file is related to a third video file;
   in response to determining that the first video file is related to the third video file, locking, by one or more processors, the first set of keyframes, wherein locking the first set of keyframes prevents the first set of keyframes from being altered;
   receiving, by one or more processors, a selection signal of the keyframe from the first set of keyframes from a user; and
   in response to receiving the selection signal of the keyframe from the first set of keyframes from the user, displaying, by one or more processors, the first video file on a display to the user by executing the first video file.

2. The method of claim 1, wherein the first set of keyframes is a single keyframe, and wherein the second set of keyframes is a single keyframe.

3. The method of claim 1, wherein the first set of keyframes comprises multiple keyframes, and wherein the second set of keyframes comprises multiple keyframes.

4. The method of claim 1, further comprising:
   selecting, by one or more processors, the new keyframe by identifying a keyframe in the second video file that is not part of the first video file.

5. The method of claim 1, further comprising:
   in response to determining that the first video file is viewed more often than the second video file, continuing to lock, by one or more processors, the first set of keyframes while adjusting the second set of keyframes.

6. The method of claim 1, further comprising:
   in response to determining that the first video file is smaller than the second video file, continuing to lock, by one or more processors, the first set of keyframes while adjusting the second set of keyframes.

7. The method of claim 1, further comprising:
   skipping over, by one or more processors, predetermined multiple incremental units of frames from the second video file until the new keyframe is identified, wherein the multiple incremental units of frames are a same size, and wherein the new keyframe is identified in response to determining that the new keyframe does not match the duplicate keyframe.

8. A computer program product for selecting and displaying keyframes for multiple video files, the computer program product comprising a non-transitory computer readable storage medium having program code embodied therewith, the program code readable and executable by a processor to perform a method comprising:
   receiving a first set of keyframes for a first video file, wherein a keyframe is a frame from a video file, and wherein the first set of keyframes is composed of multiple keyframes from the first video file;
   receiving a second set of keyframes for a second video file, wherein the second set of keyframes is composed of multiple keyframes from the second video file;
   comparing the first set of keyframes to the second set of keyframes;
   in response to determining that a keyframe from the first set of keyframes and a keyframe from the second set of keyframes are a duplicate keyframe, selecting a new keyframe for the second video file, wherein the new keyframe replaces the duplicate keyframe in the second set of keyframes;
   displaying the first set of keyframes with the duplicate keyframe on a graphical user interface (GUI) to represent the first video file;
   displaying the second set of keyframes without the duplicate keyframe and with the new keyframe on the GUI to represent the second video file;
   determining that the first video file is related to a third video file;
   in response to determining that the first video file is related to the third video file, locking the first set of keyframes, wherein locking the first set of keyframes prevents the first set of keyframes from being altered;
   receiving a selection signal of the keyframe from the first set of keyframes from a user; and
   in response to receiving the selection signal of the keyframe from the first set of keyframes from the user, displaying the first video file to the user on a display by executing the first video file.

9. The computer program product of claim 8, wherein the first set of keyframes is a single keyframe, and wherein the second set of keyframes is a single keyframe.

10. The computer program product of claim 8, wherein the first set of keyframes comprises multiple keyframes, and wherein the second set of keyframes comprises multiple keyframes.

11. The computer program product of claim 8, wherein the method further comprises:
    selecting the new keyframe by identifying a keyframe in the second video file that is not part of the first video file.

12. The computer program product of claim 8, wherein the method further comprises:
    in response to determining that the first video file is viewed more often than the second video file, continuing to lock the first set of keyframes while adjusting the second set of keyframes.

13. The computer program product of claim 8, wherein the method further comprises:

in response to determining that the first video file is smaller than the second video file, continuing to lock the first set of keyframes while adjusting the second set of keyframes.

14. The computer program product of claim 8, wherein the method further comprises:

skipping over predetermined multiple incremental units of frames from the second video file until the new keyframe is identified, wherein the multiple incremental units of frames are a same size, and wherein the new keyframe is identified in response to determining that the new keyframe does not match the duplicate keyframe.

15. A computer system comprising:

a processor, a computer readable memory, and a non-transitory computer readable storage medium;

first program instructions to receive a first set of keyframes for a first video file, wherein a keyframe is a frame from a video file, and wherein the first set of keyframes is composed of multiple keyframes from the first video file;

second program instructions to receive a second set of keyframes for a second video file, wherein the second set of keyframes is composed of multiple keyframes from the second video file;

third program instructions to compare the first set of keyframes to the second set of keyframes;

fourth program instructions to, in response to determining that a keyframe from the first set of keyframes and a keyframe from the second set of keyframes are a duplicate keyframe, select a new keyframe for the second video file, wherein the new keyframe replaces the duplicate keyframe in the second set of keyframes;

fifth program instructions to display the first set of keyframes with the duplicate keyframe on a graphical user interface (GUI) to represent the first video file;

sixth program instructions to display the second set of keyframes without the duplicate keyframe and with the new keyframe on the GUI to represent the second video file;

seventh program instructions to determine that the first video file is smaller than the second video file;

eighth program instructions to, in response to determining that the first video file is smaller than the second video file, lock the first set of keyframes, wherein locking the first set of keyframes prevents the first set of keyframes from being altered while the new keyframe for the second video file is selected;

ninth program instructions to receive a selection signal of the keyframe from the first set of keyframes from a user; and tenth program instructions to, in response to receiving the selection signal of the keyframe from the first set of keyframes from the user, display the first video file to the user by executing the first video file; and wherein the first, second, third, fourth, fifth, sixth, seventh, eighth, ninth, and tenth program instructions are stored on the non-transitory computer readable storage medium for execution by one or more processors via the computer readable memory.

16. The computer system of claim 15, wherein the first set of keyframes is a single keyframe, and wherein the second set of keyframes is a single keyframe.

17. The computer system of claim 15, wherein the first set of keyframes comprises multiple keyframes, and wherein the second set of keyframes comprises multiple keyframes.

18. The computer system of claim 15, further comprising:

eleventh program instructions to select the new keyframe by identifying a keyframe in the second video file that is not part of the first video file; and wherein the eleventh program instructions are stored on the non-transitory computer readable storage medium for execution by one or more processors via the computer readable memory.

19. The computer system of claim 15, further comprising:

eleventh program instructions to, in response to determining that the first video file is viewed more often than the second video file, continue to lock the first set of keyframes while adjusting the second set of keyframes; and wherein the eleventh program instructions are stored on the non-transitory computer readable storage medium for execution by one or more processors via the computer readable memory.

* * * * *